(12) United States Patent
Schultz

(10) Patent No.: US 7,331,744 B2
(45) Date of Patent: *Feb. 19, 2008

(54) LOBED DRIVE FOR HI-LITE FASTENER

(75) Inventor: Dennis Schultz, San Juan Capistrano, CA (US)

(73) Assignee: Hi-Shear Corporation, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/080,025

(22) Filed: Mar. 14, 2005

(65) Prior Publication Data

US 2005/0155467 A1    Jul. 21, 2005

Related U.S. Application Data

(60) Division of application No. 10/660,331, filed on Sep. 11, 2003, which is a continuation of application No. 10/052,238, filed on Jan. 16, 2002, now Pat. No. 6,655,888.

(51) Int. Cl.
*F16B 23/00* (2006.01)

(52) U.S. Cl. .................................... 411/403

(58) Field of Classification Search .............. 411/402, 411/403, 409, 410
See application file for complete search history.

(56) References Cited

U.S. PATENT DOCUMENTS

| | | | | |
|---|---|---|---|---|
| 2,216,382 A | * | 10/1940 | West et al. ............. | 411/403 |
| 2,969,250 A | | 1/1961 | Kull | |
| 3,584,667 A | * | 6/1971 | Reiland ................. | 81/460 |
| 3,695,124 A | | 10/1972 | Myers | |
| 3,885,480 A | | 5/1975 | Muenchinger | |
| 4,073,160 A | * | 2/1978 | Perret .................. | 464/158 |
| 4,367,664 A | | 1/1983 | Ekshtut | |
| 4,459,074 A | | 7/1984 | Capuano | |
| 4,512,220 A | * | 4/1985 | Barnhill et al. ......... | 81/121.1 |
| 4,882,957 A | | 11/1989 | Wright et al. | |
| 4,930,378 A | * | 6/1990 | Colvin ................. | 81/121.1 |
| 4,947,712 A | | 8/1990 | Brosnan | |
| 5,012,706 A | | 5/1991 | Wright et al. | |
| 5,174,704 A | | 12/1992 | Kazino et al. | |
| 5,219,392 A | * | 6/1993 | Ruzicka et al. ......... | 81/124.3 |

(Continued)

FOREIGN PATENT DOCUMENTS

CN    1615406 A    11/2005

(Continued)

*Primary Examiner*—Flemming Saether
(74) *Attorney, Agent, or Firm*—Fulwider Patton LLP

(57) ABSTRACT

A drive socket for a male threaded fastener includes three rounded lobes of equal radius which are located equidistant from the center of the fastener and 120° apart from each other. The drive socket also includes three flat surfaces, each flat surface being located opposite one of the lobes and equidistant from the center of the fastener. Another embodiment of a drive socket includes a first set of three lobes and a second set of three lobes, each lobe being of equal radius and equidistant from the center of the fastener. The lobes of the first set are 120° apart and the lobes of the second set are also 120° apart and 60° apart from the lobes of the first set. Each of the lobes of the first set includes a flat surface which is adjacent and tangential to the radius portion of the lobe.

6 Claims, 2 Drawing Sheets

U.S. PATENT DOCUMENTS

| | | | |
|---|---|---|---|
| 5,277,531 A | 1/1994 | Krivec | |
| 5,388,486 A | 2/1995 | Ruzicka et al. | |
| 5,481,948 A | 1/1996 | Zerkovitz | |
| 5,577,871 A | 11/1996 | Brugola | |
| 5,765,980 A | 6/1998 | Sudo et al. | |
| 5,797,659 A | 8/1998 | Fuller | |
| 5,960,681 A | 10/1999 | Anderson et al. | |
| 6,003,411 A | 12/1999 | Knox et al. | |
| 6,016,727 A | 1/2000 | Morgan | |
| 6,098,501 A | 8/2000 | Sundstrom | |
| 6,131,493 A | 10/2000 | Yamamoto et al. | |
| 6,632,057 B1 * | 10/2003 | Fauchet | 411/403 |
| 6,655,888 B2 * | 12/2003 | Schultz | 411/403 |
| 6,736,580 B2 * | 5/2004 | Schultz | 411/403 |

FOREIGN PATENT DOCUMENTS

| | | |
|---|---|---|
| DE | 4321325 A1 | 5/1995 |
| DE | 29618994 U1 | 12/1996 |
| GB | 2061439 | 5/1981 |
| GB | 2335962 | 6/1999 |
| WO | WO 98/07995 | 2/1998 |
| WO | WO 0132365 | 10/2001 |

* cited by examiner

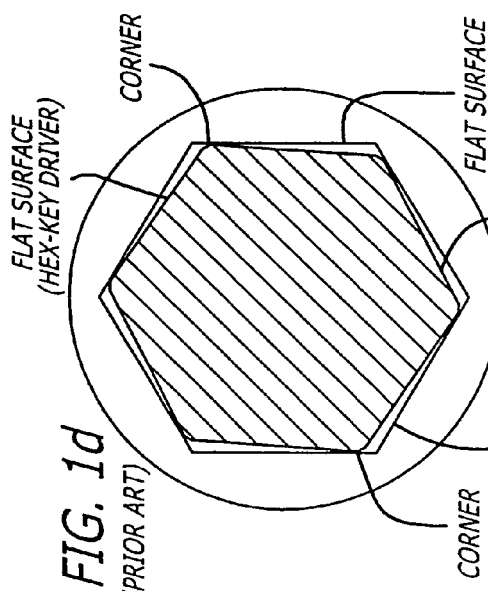
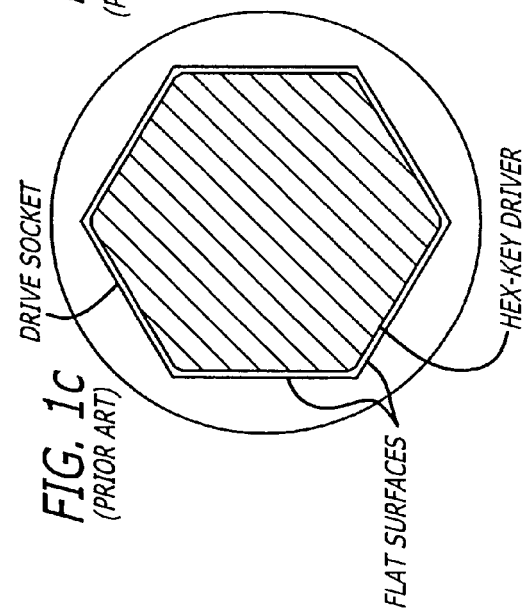
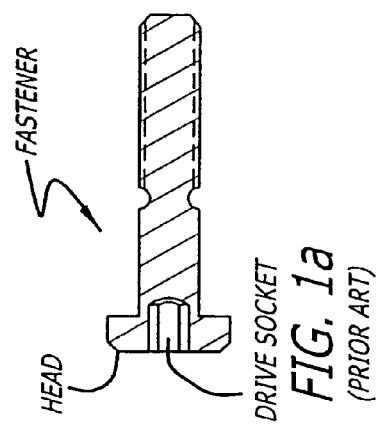
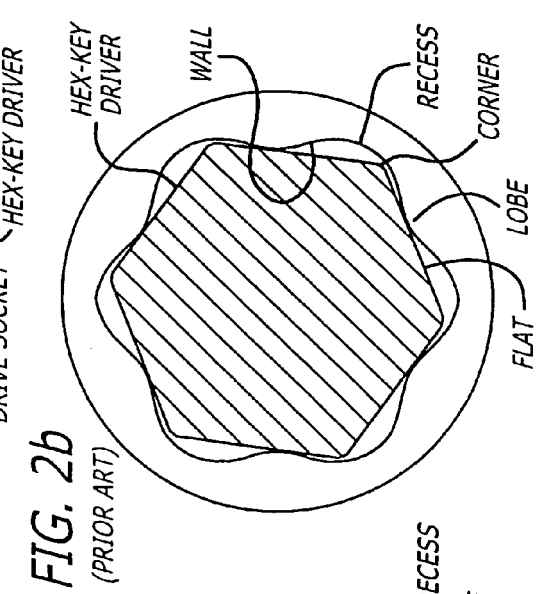
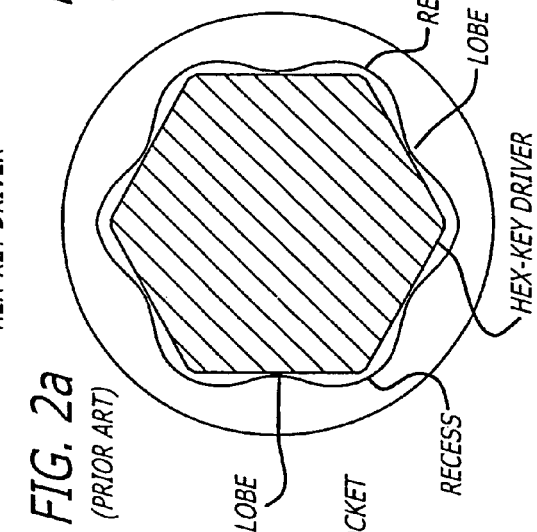
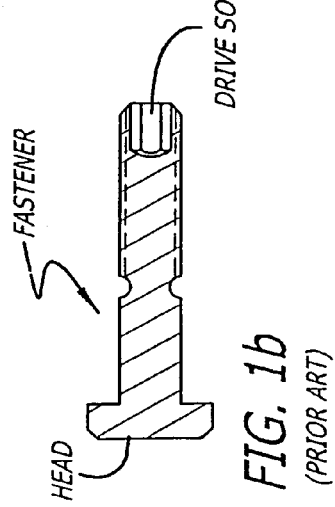

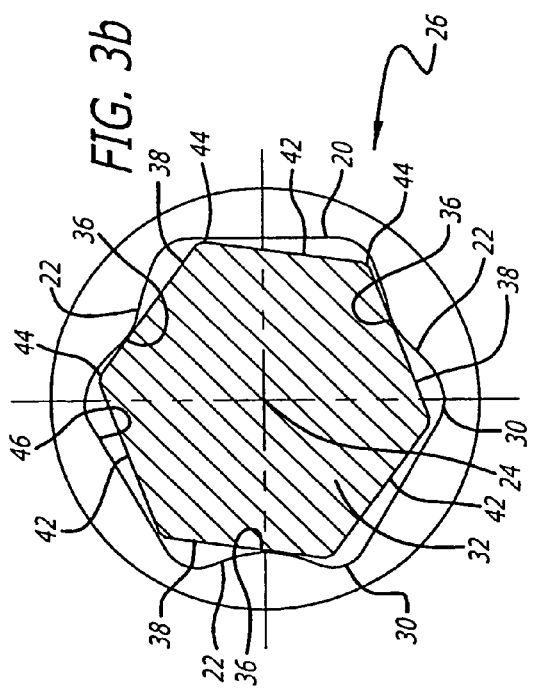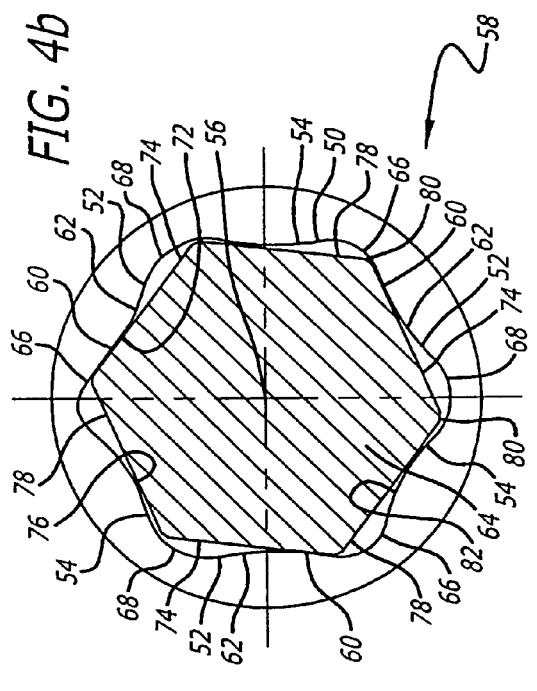

LOBED DRIVE FOR HI-LITE FASTENER

CROSS-REFERENCE TO RELATED APPLICATION

This application is a divisional of Ser. No. 10/660,331, filed Sep. 11, 2003, which is a continuation of Ser. No. 10/052,238, filed Jan. 16, 2002, now U.S. Pat. No. 6,655,888.

BACKGROUND OF THE INVENTION

1. Field of the Invention

This invention relates generally to structural fasteners, and more particularly relates to drive sockets on threaded male structural fasteners.

2. Description of Related Art

Threaded male structural fasteners of the type to which this invention is directed include an axial drive socket, or wrench engaging recess, located either on a head (FIG. 1a) of the fastener or on the opposite end of the fastener (FIG. 1b). The drive socket (FIG. 1c) includes a plurality of substantially equally spaced and sized flat surfaces which receive a mating wrench type key, or wrench key. The drive socket may be hexagonally shaped to receive a hexagonal Allen wrench type key, or hex-key driver. During use, an end of the wrench key is inserted into the drive socket in the male fastener and is either held in place to permit a threaded female fastener, such as a nut, to be screwed onto the threads of the male fastener, or the hex-key driver is rotated in order to screw the male fastener into the female fastener or other female threaded hole.

Clearance is required between a hex-key driver and the drive socket which the hex-key driver is inserted into. For example, the clearance between a 2.4 mm (3/32-inch) hexagonal drive socket and a 2.4 mm (3/32-inch) hex-key driver is 0.04 mm (0.0015 inch) all around. With this amount of clearance, the hex-key driver can rotate approximately three degrees before contacting the mating surfaces of the drive socket (FIG. 1d), resulting in the intersections, or corners, between the surfaces of the hex-key driver contacting the flat surfaces of the drive socket. With the corners between the surfaces of the hex-key driver providing the main driving force from the hex-key driver, high stress concentrations are placed on the corners of the hex-key driver, but there is very little material providing support for the corners. As a result, when a load that is sufficient to set the desired torque between the male threaded fastener and the female threaded fastener or part is applied to a hex-key driver during use, the material at the corners may shear off of the hex-key driver, leaving the hex-key driver in a stripped condition.

Another problem that can occur is that as the hex-key driver is rotated within the drive socket, the hex-key driver may become wedged within the socket, thus causing the hex-key driver to bind within the socket. After setting the desired torque between the male threaded fastener and the female threaded fastener, rotation of the hex-key driver must be reversed to break the bind between the hex-key driver and the socket.

Methods which have been developed to prevent the stripping of hex-key drivers during use include fabricating the hex-key drivers from stronger materials. The present invention reduces the need for a special high-strength hex-key. Another method of preventing hex-key drivers from stripping includes making the drive sockets in the fasteners deeper. However, making the drive socket deeper may compromise the tensile strength of the fastener through the area of the drive socket, especially on fasteners having the drive socket on the end of the fastener opposite the head (FIG. 1b).

One attempt to alleviate the problem of the hex-key drivers stripping within the drive sockets included reconfiguring the drive socket to include six rounded lobes of substantially equal radius, as depicted in FIG. 2a. The lobes are located substantially equidistant from the center of the fastener. Also, adjacent lobes are located substantially equidistant circumferentially from each other. Each of the lobes projects inward toward the center of the fastener. The embodiment also includes six curved recesses located between and adjacent each lobe, thereby combining for a total of six recesses. Each of the recesses is blended into its adjacent lobes to form a substantially smooth transition between the lobes and the recesses.

Referring to FIG. 2b, when the hex-key driver is rotated, such as to drive the male threaded fastener relative to a female threaded fastener, a portion of the flats on the hex-key driver contact the lobes while the corners of the hex-key driver remain within the recesses and out of contact with the wall of the drive socket. One problem with the configuration of FIGS. 2a and 2b is that it enlarges the drive socket considerably, thereby weakening the fastener head.

Hence, those skilled in the art have recognized a need for a male threaded fastener having a drive socket that may receive high stress from a hex-key driver and reduce the tendency of the hex-key driver to strip or to bind within the drive socket. The need to configure the drive socket so that it substantially maintains the tensile strength of male threaded fasteners and the strength of the fastener head has also been recognized. The present invention fulfills these needs and others.

SUMMARY OF THE INVENTION

Briefly, and in general terms, the present invention is directed to a drive socket for a fastener which is driven by a hex-key driver. In one presently preferred embodiment, the drive socket includes three rounded lobes of substantially equal radius. The three lobes are positioned about a center of the fastener and are located substantially equidistant from the center and approximately 120° apart from each other. The drive socket also includes three flat surfaces positioned about the center of the fastener. Each flat surface is located substantially opposite one of the lobes and substantially equidistant from the center of the fastener. The drive socket further includes recesses which are located between the lobes and the flat surfaces.

In one currently preferred aspect of the invention, the lobes project inward toward the center of the fastener. Each of the recesses forms a substantially smooth transition between a lobe and a flat surface. The lobes are positioned to provide a first clearance between an apex of each of the lobes and corresponding surfaces on a hex-key driver inserted into the drive socket. The flat surfaces are positioned to provide a second clearance between the flat surfaces and corresponding surfaces on the hex-key driver. In one currently preferred embodiment, the first clearance is approximately 0.04 mm (0.0015 inch) and the second clearance is approximately 0.10 mm (0.0038 inch). In another currently preferred embodiment, the recesses are sized to provide sufficient clearance such that the corners of a hex-key driver inserted into the drive socket do not contact a wall of the drive socket.

In another presently preferred embodiment, the drive socket of the present invention includes a first set of three lobes of substantially equal radius which are positioned about a center of the fastener. The lobes within the first set are substantially equidistant from the center of the fastener and approximately 120° apart from each other. Each of the lobes of the first set includes a flat surface which is located adjacent and substantially tangential to the radius portion of the lobe. The drive socket also includes a second set of three lobes of substantially equal radius positioned about the center of the fastener. The lobes within the second set are substantially equidistant from the center of the fastener, approximately 120° apart from each other and approximately 60° apart from the lobes of the first set. The drive socket further includes recesses located between the lobes of the first set and the lobes of the second set.

In one currently preferred aspect of the invention, each of the lobes of the first set and each of the lobes of the second set projects inward toward the center of the fastener. In another currently preferred aspect of the invention, the radius of the lobes of the first set and the radius of the lobes of the second set are substantially equal. The distance between the lobes of the first set and the center of the fastener and the distance between the lobes of the second set and the center of the fastener are also substantially equal. Each of the recesses forms a substantially smooth transition between the lobes of the first set and the lobes of the second set. The recesses are sized to provide sufficient clearance such that the corners of a hex-key driver inserted into the drive socket do not contact a wall of the drive socket. The flat surfaces of the lobes in the first set are positioned substantially 120° apart from each other.

In another currently preferred aspect of the invention, the lobes of the first set are positioned to provide a first clearance between an apex of each of the lobes of the first set and corresponding surfaces on a hex-key driver inserted into the drive socket. Similarly, the lobes of the second set are positioned to provide a second clearance between an apex of each of the lobes of the second set and corresponding surfaces on the hex-key driver inserted into the drive socket. The first clearance and the second clearance are both approximately 0.04 mm (0.0015 inch).

From the above, it may be seen that the present invention provides for configurations of drive sockets for fasteners which reduce the tendency of the hex-key driver to strip or to bind within the drive socket. Further, it may also be seen that the drive socket substantially maintains the tensile strength of the fastener and the strength of the fastener head. These and other aspects and advantages of the invention will become apparent from the following detailed description and the accompanying drawings, which illustrate by way of example the features of the invention.

BRIEF DESCRIPTION OF THE DRAWINGS

FIG. 1a is section view of an embodiment of a prior art fastener depicting a hexagon shape drive socket positioned at the head of the fastener.

FIG. 1b is a section view of an embodiment of a prior art fastener depicting a hexagon shape drive socket positioned at an end of the fastener opposite the head.

FIG. 1c is a plan view of the drive socket of FIG. 1b depicting the drive socket with a hex-key driver inserted within the drive socket.

FIG. 1d is a plan view of the drive socket of FIG. 1c with the hex-key driver rotated within the drive socket.

FIG. 2a is a plan view of the head of a prior art fastener depicting a drive socket having six lobes and six recesses with a hex-key driver inserted within the drive socket.

FIG. 2b is a plan view of the head of FIG. 3a with the hex-key driver rotated within the drive socket.

FIG. 3a is a plan view of a drive socket having three lobes and three flat surfaces with a hex-key driver inserted within the drive socket.

FIG. 3b is a plan view of the drive socket of FIG. 3a with the hex-key driver rotated within the drive socket.

FIG. 4a is a plan view of a drive socket having six lobes with three of the lobes including a flat surface with a hex-key driver inserted within the drive socket.

FIG. 4b is a plan view of the drive socket of FIG. 4a with the hex-key driver rotated within the drive socket.

DETAILED DESCRIPTION OF THE PREFERRED EMBODIMENTS

As shown in the drawings for purposes of illustration, the invention is embodied in a drive socket for a male threaded fastener. Referring to the drawings, in which like reference numerals are used to designate like or corresponding elements among the several figures, FIG. 3a depicts a drive socket 20 of the present invention. The drive socket 20 includes three rounded lobes 22 of substantially equal radius. The lobes 22 are located substantially equidistant from the center 24 of the fastener 26, as well as substantially equidistant circumferentially from each other. Each of the lobes 22 projects inward toward the center 24 of the fastener 26. The drive socket 20 may also include three flat surfaces 28, each flat surface being located substantially opposite one of the lobes 22 and substantially equidistant from the center 24 of the fastener 26.

The drive socket 20 of one currently preferred embodiment may also include curved recesses 30 between the lobes 22 and the flat surfaces 28, thereby combining for a total of six recesses. Each of the recesses 30 may be blended into its adjacent lobe 22 and flat surface 28 to form a substantially smooth transition between the recesses and the lobes and between the recesses and the flat surfaces.

The lobes 22, flat surfaces 28 and recesses 30 of the drive socket 20 are spaced from the center 24 of the fastener 26 such that when a hex-key driver 32 is inserted into the drive socket, there is a first clearance 34 between an apex 36 of each of the lobes and a first set of alternating flat surfaces 38 on the hex-key driver. In one currently preferred embodiment, the first clearance 34 is approximately 0.04 mm (0.0015 inch). A second clearance 40 is also provided between the flat surfaces 28 of the drive socket 20 and a second set of alternating flat surfaces 42 on the hex-key driver 32. In one currently preferred embodiment, the second clearance 40 is approximately 0.10 mm (0.0038 inch). Also, the recesses 30 provide sufficient clearance such that the corners 44 of the hex-key driver 32 do not contact the wall 46 of the drive socket 20.

Referring to FIG. 3b, when the hex-key driver 32 is rotated clockwise, such as to drive the male threaded fastener 26 relative to a female threaded fastener, a portion of each of the flat surfaces of the first set of alternating flat surfaces 38 on the hex-key driver contacts the lobes 22 in the drive socket 20 while the corners 44 of the hex-key driver remain out of contact with the wall 46 of the drive socket. The corners 44 of the hex-key driver 32 may either remain within the recesses 30 or move to a location proximate the flat surfaces 28 of the drive socket 20. In one currently preferred embodiment, the hex-key driver 32 may rotate approximately 6° prior to contact between the first set of alternating flat surfaces 38 on the hex-key driver and the lobes 22 with the lobes contacting the first set of alternating flat surfaces on the hex-key driver approximately one-third of the distance across the surfaces from the corners 44 of the hex-key driver. As a result, a relatively large amount of material supports the hex-key driver 32 behind the three contact points between the hex-key driver and the lobes 22 in comparison to the prior art hexagonal drive socket (FIGS. 1c and 1d).

Counterclockwise rotation of the hex-key driver 32 (not shown), such as to unscrew the male threaded fastener 26, creates substantially equivalent contact between the drive socket 20 and the hex-key driver as when the hex-key driver is rotated clockwise. Hence, a portion of each of the flat surfaces of the first set of alternating flat surfaces 38 on the hex-key driver contacts the lobes 22 in the drive socket 20 while the corners 44 of the hex-key driver remain out of contact with the wall 46 of the drive socket. Contact between the lobes 22 and the first set of alternating flat surfaces 38 occurs approximately one-third of the distance across the surfaces from the corners 44 of the hex-key driver 32.

By eliminating contact between the corners 44 of the hex-key driver 32 and the wall 46 of the drive socket 20, as depicted in FIGS. 3a and 3b, wear to the hex-key driver is significantly reduced in comparison to the use of the prior art drive socket of FIG. 1c. Due to the reduction of wear to the hex-key driver 32 by the configuration of the drive socket 20, the depth of the drive socket may be reduced in comparison to the prior art drive socket. Further, the inclusion of the flat surfaces 28 reduces the amount of material removed from the fastener 26 in comparison to the prior art drive socket depicted in FIGS. 2a and 2b. Reducing the amount of material removed from the fastener 26 aids in maximizing the strength of the fastener 26.

Referring to FIG. 4a, another currently preferred embodiment of a drive socket 50 includes a first set of three lobes 52 and a second set of three lobes 54, for a total of six lobes, each lobe being of substantially equal radius. The lobes 52, 54 are located substantially equidistant from the center 56 of the fastener 58. The lobes 52 of the first set are approximately 120° apart from each other. The lobes 54 of the second set are also approximately 120° apart from each other and alternate between the lobes 52 of the first set so that each lobe 52 from the first set is approximately 60° apart from a lobe 54 of the second set. Each of the lobes 52, 54 projects inward toward the center 56 of the fastener 58. Each of the lobes 52 within the first set includes a flat surface 60 which is located adjacent and substantially tangential to the radius portion 62 of the lobe 52. The flat surfaces 60 are positioned such that they are substantially 120° apart from each other. The flat surfaces 60 on the lobes 52 of the first set and the lobes 54 of the second set function as contact surfaces for a hex-key driver 64 during clockwise rotation of the fastener.

The drive socket 50 of the present invention may also include a first set of curved recesses 66 and a second set of curved recesses 68 between the lobes 52 of the first set and the lobes 54 of the second set, thereby combining for a total of six recesses. However, the first set of recesses 66, which are located between the flat surfaces 60 on the lobes 52 of the first set and the adjacent lobes 54 of the second set may be a different size than the second set of recesses 68 which are located between the radius portions 62 of the lobes 52 of the first set and the adjacent lobes 54 of the second set. Each of the first 66 and second 68 sets of recesses may be blended into the first 52 and second 54 sets of lobes to form a substantially smooth transition between the recesses and lobes.

The first 52 and second 54 sets of lobes and first 66 and second 68 sets of recesses of the drive socket 50 are spaced from the center 56 of the fastener 58 such that when the hex-key driver 64 is inserted into the drive socket 50, there is a clearance 70 between the hex-key driver and the drive socket. More particularly, there is a clearance 70 between a first apex 72 on each of the lobes 52 of the first set and a first set of alternating flat surfaces 74 on the hex-key driver. There is a substantially equal clearance 70 between a second apex 76 on each of the lobes 54 of the second set and a second set of alternating flat surfaces 78 on the hex-key driver. In one currently preferred embodiment, the clearance 70 is approximately 0.04 mm (0.0015 inch). Also, the first 66 and second 68 sets of recesses provide sufficient clearance such that the corners 80 of the hex-key driver 64 do not contact the wall 82 of the drive socket 50.

Referring to FIG. 4b, when the hex-key driver 64 is rotated clockwise, such as to drive the male threaded fastener 58 relative to a female threaded fastener, the first set of alternating flat surfaces 74 on the hex-key driver contact the flat surfaces 60 of the first set of lobes 52 in such manner that there is substantially surface-to-surface contact between the first set of alternating flat surfaces on the hex-key driver and the flat surfaces of the first set of lobes. Further, the second set of alternating flat surfaces 78 on the hex-key driver 64 contacts the three lobes 54 of the second set. The corners 80 of the hex-key driver 64, however, remain within the first 66 and second 68 set of recesses and out of contact with the wall 82 of the drive socket 50. In one currently preferred embodiment, the hex-key driver 64 may rotate approximately 6° prior to contact between the first 74 and second 78 sets of alternating flat surfaces on the hex-key driver and the first 52 and second 54 set of lobes of the drive socket 50. In this manner, the flat surfaces 60 of the first set of lobes 52 may have surface contact with the surfaces of the first set of alternating flat surfaces 74 on the hex-key driver 64 between the corner 80 of the hex-key driver to a location approximately one-third of the distance across the surfaces of the first set of alternating flat surfaces. Also, the lobes 54 of the second set may contact the surfaces of the second set of alternating flat surfaces 78 at a location approximately one-third of the distance across the surfaces of the second set of alternating flat surfaces from the corners 80 of the hex-key driver. As a result, similar to the use of the drive socket 20 in the embodiment depicted in FIGS. 3a and 3b, a relatively large amount of material supports the hex-key driver 64 behind the contact points and contact surfaces in comparison to the prior art hexagonal drive socket (FIGS. 1c and 1d).

With the surface contact created between the flat surfaces 60 of the first set of lobes 52 and the first set of alternating flat surfaces 74 of the hex-key driver 64 during clockwise rotation of the hex-key driver, the likelihood of the hex-key driver binding is significantly reduced in comparison to the prior art drive sockets (FIG. 1c). With the reduction of binding of the hex-key driver 64 within the drive socket 50, there is less need to reverse the rotation direction of the hex-key driver to break the bind prior to removing the hex-key driver from the drive socket. Further, the reduction of binding reduces the amount of wear to the hex-key driver 64 during use.

When the hex-key driver 64 is rotated counterclockwise (not shown), such as to unscrew the male threaded fastener 58, each of the first 74 and second 78 set of alternating flat surfaces on the hex-key driver 64 may contact a corresponding lobe from the first 52 or second 54 set of lobes while the corners 80 of the hex-key driver, again, remain within the first 66 and second 68 sets of recesses and out of contact with the wall 82 of the drive socket 50. The lobes 52, 54 of the first and second set contact the first 74 and second 78 sets of alternating flat surfaces on the hex-key driver 64 approximately one-third of the distance across the surfaces from the corners 80 of the hex-key driver.

By eliminating contact between the corners 80 of the hex-key driver 64 and the wall 82 of the drive socket 50, as depicted in FIGS. 4a and 4b, wear to the hex-key driver is significantly reduced in comparison to the prior art drive socket of FIG. 1c. Due to the reduction of wear of the hex-key driver 64 by the configuration of the drive socket 50, the depth of the drive socket may be reduced in comparison to the prior art drive socket. Reducing the depth of the drive socket 50, in turn, aids in maximizing the strength of the fastener 58.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In a fastener having an axial drive socket for receiving a wrench key driver, the fastener including a shaft with a first end and a second end, an enlarged head at one of the first and second ends, and male threads at the other of the first and second ends, and the axial drive socket being located in one of the first and second ends of the shaft, the improvement comprising:
   a first plurality of sides of the axial drive socket, said first plurality of sides of the axial drive socket being substantially equidistant from a center of the fastener and from each other, each of the sides of the first plurality of sides including a curved radius portion and one flat surface portion located adjacent to and substantially tangential to the curved radius portion;
   a second plurality of sides of the axial drive socket forming rounded lobes of substantially equal radius not including a flat surface portion, said second plurality of sides of the axial drive socket being substantially equidistant from the center of the fastener and from each other, and said first and second plurality of sides of the axial drive socket being alternatingly arranged about the axial drive socket; and
   curved recesses located between the first plurality of sides and the second plurality of sides, each of said flat surface portions of said first plurality of sides being connected to a corresponding adjacent lobe of said second plurality of sides by one of said curved recesses, and each of said curved radius portions of said first plurality of sides being directly connected to a corresponding adjacent lobe of said second plurality of sides by one of said curved recesses.

2. The fastener of claim 1, wherein each of the sides of the first plurality of sides of the axial drive socket and each of the sides of the second plurality of sides of the axial drive socket project inward toward the center of the fastener.

3. The fastener of claim 1, wherein the radii of the curved radius portions of the first plurality of sides of the axial drive socket and the radii of the sides of the second plurality of sides of the axial drive socket are substantially equal.

4. The fastener of claim 1, wherein the distance between the curved radius portions of the first plurality of sides of the axial drive socket and the center of the fastener and the distance between the sides of the second plurality of sides of the axial drive socket and the center of the fastener are substantially equal.

5. The fastener of claim 1, wherein:
   the sides of the first plurality of sides of the axial drive socket are positioned to provide a clearance between a first apex of each of the sides of the first plurality of sides of the axial drive socket and corresponding surfaces on a wrench key driver inserted into the axial drive socket; and
   the sides of the second plurality of sides of the axial drive socket are positioned to provide a clearance between a second apex of each of the sides of the second plurality of sides of the axial drive socket and corresponding surfaces on the key driver inserted into the axial drive socket, the clearance between the second apices of the second plurality of sides of the axial drive socket and the corresponding surfaces on the key driver being substantially equal to the clearance between the first apices of the first plurality of sides of the axial drive socket and the corresponding surfaces on the key driver.

6. The fastener of claim 5, wherein:
   the clearance between the first apices of the first plurality of sides of the axial drive socket and the corresponding surfaces on the key driver is approximately 0.04 mm (0.0015 inch); and
   the clearance between the second apices of the second plurality of sides of the axial drive socket and the corresponding surfaces on the key driver is approximately 0.04 mm (0.0015 inch).

* * * * *